(12) United States Patent
Olson et al.

(10) Patent No.: US 9,125,392 B2
(45) Date of Patent: Sep. 8, 2015

(54) METHOD OF TREATING ARTICLES WITH CARBON DIOXIDE

(71) Applicant: Ecolab USA Inc., St. Paul, MN (US)

(72) Inventors: Joelle Francine Olson, Shoreview, MN (US); Kim R. Smith, Woodbury, MN (US); John E. Thomas, River Falls, WI (US); Andrew M. Schultz, Minneapolis, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 14/567,125

(22) Filed: Dec. 11, 2014

(65) Prior Publication Data

US 2015/0150234 A1    Jun. 4, 2015

Related U.S. Application Data

(63) Continuation of application No. 13/485,370, filed on May 31, 2012, now Pat. No. 8,931,206.

(60) Provisional application No. 61/495,258, filed on Jun. 9, 2011.

(51) Int. Cl.
*A01M 13/00* (2006.01)
*A01M 1/20* (2006.01)

(52) U.S. Cl.
CPC .............. *A01M 13/003* (2013.01); *A01M 1/20* (2013.01)

(58) Field of Classification Search
CPC ....... A01M 1/00; A01M 1/023; A01M 13/00; A01M 13/003
USPC .......................... 43/124, 125, 129, 132.1, 123
See application file for complete search history.

(56) References Cited

U.S. PATENT DOCUMENTS

| | | | |
|---|---|---|---|
| 5,597,599 A * | 1/1997 | Smith et al. ................... 426/316 |
| 6,063,418 A | 5/2000 | Sugimoto et al. |
| 6,766,612 B1 | 7/2004 | Liu |
| 7,910,056 B2 | 3/2011 | Ivanine et al. |
| 8,146,290 B1 | 4/2012 | Telly |
| 8,931,206 B2 | 1/2015 | Olson et al. |
| 2003/0033965 A1 | 2/2003 | Van Lint |
| 2006/0086038 A1 | 4/2006 | Mosher |
| 2009/0145019 A1 | 6/2009 | Nolen et al. |
| 2009/0145020 A1 | 6/2009 | McKnight |
| 2009/0313883 A1 | 12/2009 | Olson et al. |
| 2011/0113674 A1 | 5/2011 | Levy |
| 2012/0233907 A1 | 9/2012 | Pattison et al. |
| 2012/0240451 A1 | 9/2012 | Ricks |

(Continued)

FOREIGN PATENT DOCUMENTS

| | | |
|---|---|---|
| EP | 0 416 255 A1 | 3/1991 |
| WO | WO2009/075839 | 6/2009 |

OTHER PUBLICATIONS

Adler et al., Modified Atmospheres. In: Alternatives to pesticides in stored-product IPM, (edited by Subramanyam and Hagstrum), Kluwer Academic Publishers, Boston, pp. 105-146 (2000).

(Continued)

*Primary Examiner* — Rob Swiatek
*Assistant Examiner* — Morgan T Barlow
(74) *Attorney, Agent, or Firm* — Merchant & Gould P.C.

(57) ABSTRACT

The present disclosure relates to treating articles suspected of being infested with bed bugs using carbon dioxide.

18 Claims, 3 Drawing Sheets

(56) References Cited

U.S. PATENT DOCUMENTS

| | | |
|---|---|---|
| 2014/0020278 A1 | 1/2014 | Smith |
| 2014/0020280 A1 | 1/2014 | Cullen |
| 2014/0041284 A1 | 2/2014 | Nugent |

OTHER PUBLICATIONS

Anderson, J.F. et al., A carbon dioxide, heat and chemical lure trap for the bedbug, *Cimex lectularius, Medical and Veterinary Entomology*, vol. 23, pp. 99-105 (2009).

Cardinal Professional Products, ECO2FUME®, http://www.cardinalproproducts.com/eco2fume.htm, 2 pages, printed Mar. 30, 2011.

Continental Carbonic, Use Dry Ice to Remove Bed Bugs, http://www.continentalcarbonic.com/dryice/remove-bed-bugs-dry-ice.php, 1 page, printed Sep. 20, 2010.

International Search Report and Written Opinion for PCT/IB2012/052756 mailed Jan. 29, 2013.

Stern Environmental Group, Bed Bug Control Services for Hotels, Motels, and Apartment Buildings; http://www.sternenvironmental.com/bedbugs/commercial.php, 3 pages, printed Sep. 20, 2010.

Tvedten, Steve, The Bug Stops Here, http://www.getipm.com/thebestcontrol/bugstop/control_bed_bugs.htm, 2 pages, printed Sep. 20, 2010.

Supplementary European Search Report (EP 12 79 6003) mailed Feb. 13, 2015 (8 pages).

\* cited by examiner

METHOD OF TREATING ARTICLES WITH CARBON DIOXIDE

CROSS-REFERENCE TO RELATED APPLICATIONS

This application is a continuation of U.S. application Ser. No. 13/485,370 filed May 31, 2012, issued as U.S. Pat. No. 8,931,206 on Jan. 13, 2015, which claims priority to Provisional Application Ser. No. 61/495,258 filed Jun. 9, 2011, the entire disclosures of which are incorporated herein by reference in their entirety.

BACKGROUND

Some methods of bed bug treatment require discarding suspected infested articles. These items can be expensive or difficult to replace, especially in the case of large objects like furniture, mattresses, and box springs, or in the case of personal belongings. Some methods of bed bug treatment exclusively rely on pesticides, which may be restricted or prohibited on certain items, particularly items that contact people. Other methods of bed bug treatment can damage objects.

It is against this background that the present disclosure is made.

SUMMARY

Surprisingly, it has been found that articles can be treated by using carbon dioxide.

Accordingly, in some aspects, the present disclosure relates to methods of treating articles that are suspected of being infested with bed bugs by placing the article inside of an enclosure, releasing $CO_2$ into the enclosure, sealing the enclosure, and letting the article sit with the $CO_2$ inside of the enclosure for a period of time up to 48 hours.

In some aspects, the present disclosure relates to methods of treating articles that are suspected of being infested with bed bugs by placing the article inside of an enclosure with a pre-filled cartridge of $CO_2$ where the cartridge has either a regulator or an adapter on it for controlling the release of the $CO_2$, opening the cartridge to start the release of the $CO_2$ into the enclosure, sealing the enclosure with the article and the cartridge inside, and leaving the article inside of the sealed enclosure with the $CO_2$ for up to 48 hours, wherein the $CO_2$ is present in an amount from about 50% up to 100% by volume of air.

In some aspects, the present disclosure relates to a kit for treating articles suspected of being infested with bed bugs that includes an enclosure, and a plurality of $CO_2$ cartridges, each cartridge filled with a known amount of $CO_2$ from about 1.1 pounds (for about 50% concentration) up to 2.2 pounds (for 100% concentration) per cubic meter inside of the enclosure. The kit also includes instructions for placing the article inside of the enclosure, opening at least one of the $CO_2$ cartridges, placing the $CO_2$ cartridge inside of the enclosure with the article, sealing the enclosure, and leaving the article and the $CO_2$ cartridge inside of the enclosure for up to 48 hours.

DETAILED DESCRIPTION

In some embodiments, the present disclosure relates to methods and kits for treating bed bugs on articles using carbon dioxide. Surprisingly it has been found that bed bugs, including bed bug eggs, can be killed using carbon dioxide for periods of time that are shorter than expected.

The present disclosure generally relates to treating articles suspected of being infested with bed bugs. Exemplary articles to be treated can include small articles such as pillows, bedding, clothing, window treatments, telephones, remote controls, alarm clocks, and the like. Exemplary articles also include personal items such as furniture, books, DVDs, picture frames, picture albums, knick knacks, electronics, cell phones, personal music players, computers, tablet computers, and the like. Exemplary items also include medium sized articles such as furniture, mattresses, box springs, headboards, nightstands, and the like. Exemplary articles that are treated include a mattress, a box spring, bedding, baseboards, headboards, nightstands, carpet, furniture, mirrors, pictures, light fixtures, window treatments, walls, ceilings, floors, clothing, appliances, commercial fixtures, telephones, remote controls, alarm clocks, and pet bedding. The article can be located in a variety of places including a hotel, a house, an apartment or multi-family complex, restaurants, an office building, a movie theater, a train, a bus, an airplane, a car, a truck, a retail store, a college dormitory, a pet groomer or veterinary clinic, a hospital, and a nursing home. Especially suited articles are personal belongings, which are difficult to treat with other forms of pest treatment because regulations limit the use of pesticides on articles that come into contact with people and the nature of personal belongings makes them susceptible to damage. Further, the sentimental value of personal belongings make them difficult to replace and therefore difficult to throw away if they become infested.

The Enclosure

The present disclosure includes placing articles inside of an enclosure. The shape and size of the enclosure can vary considerably. But, the enclosure preferably has certain characteristics to it. For example, the enclosure, can preferably be opened and closed, or sealed. When the enclosure is sealed, it is preferably air tight. While it is desirable for the sealed enclosure to be air tight, it preferably includes a vent to accommodate the increased volume of gas inside of the enclosure as carbon dioxide is released over the period of treatment. In some embodiments, the enclosure is preferably not higher than 2 feet.

Figure 1:
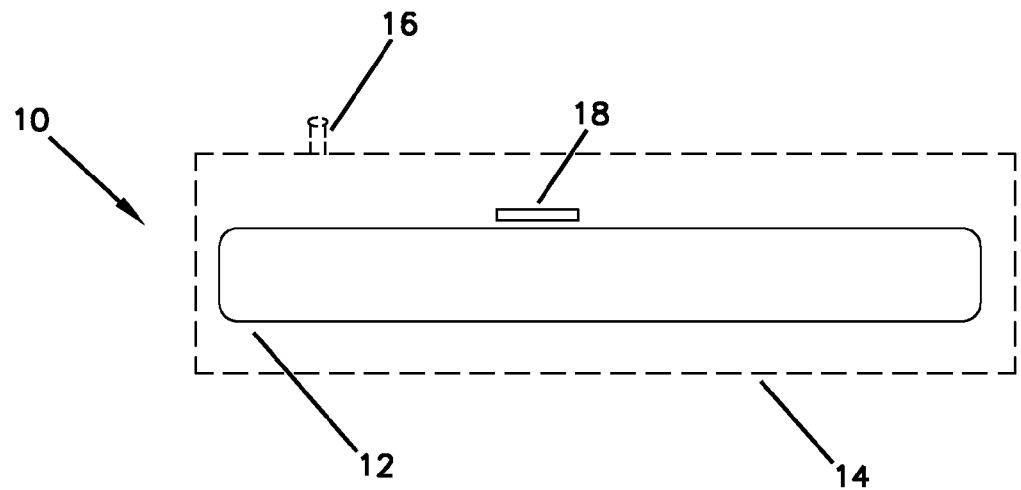
FIG. 1 shows a schematic of an article such as a mattress or box spring inside of an enclosure.
Figure 2:
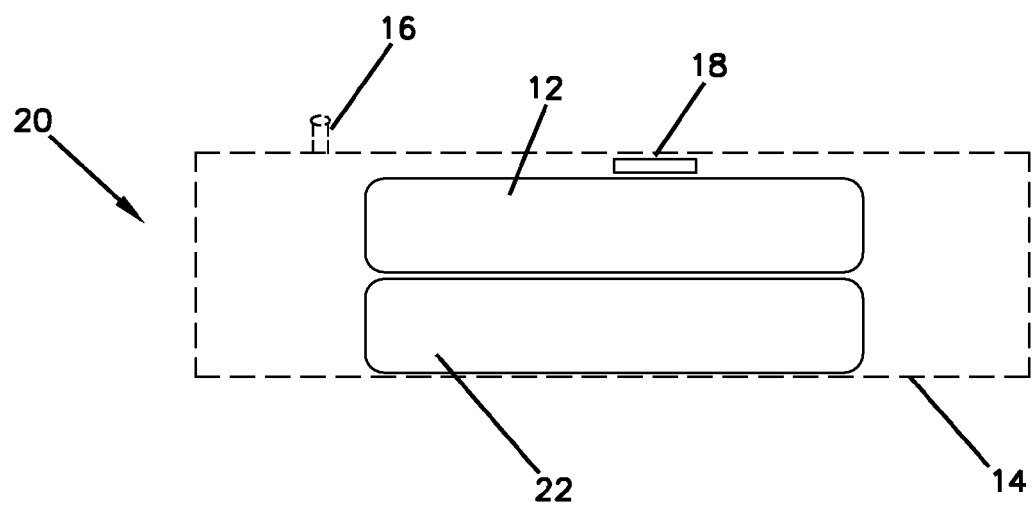
FIG. 2 shows a schematic of two articles such as a mattress and box spring inside of an enclosure.
Figure 3:
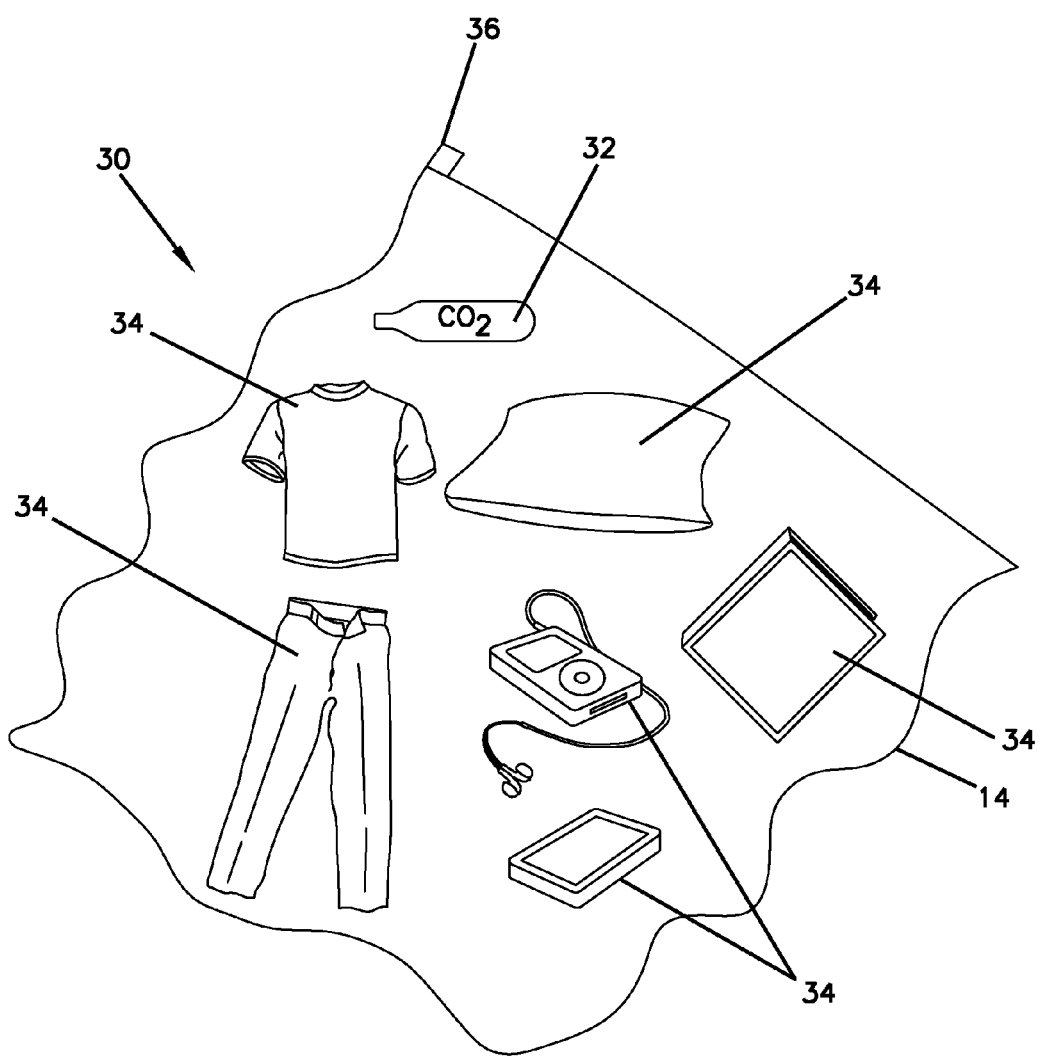
FIG. 3 shows a schematic of personal articles inside of an enclosure.

Exemplary enclosures include bags, totes, bins, drums, and containers. Exemplary bags are slightly larger than the contents they are designed to hold. For example, in the case of mattresses and box springs, the bags are large enough to accommodate getting the box spring and/or mattress in and out of the bag, but not much larger than that. In the case of personal items, the bags are large enough to accommodate a certain number of personal items while allowing sufficient air space around the items for the carbon dioxide to circulate. The bag is preferably durable enough to move the articles in and out of the bag. In some embodiments, the bag is made out of multiple layers, for example 2-ply, 3-ply, or 4-ply material. Exemplary materials include polyethylene, polypropylene, polystyrene, polyvinyl chloride, polytetrafluoroethylene, nylon, vinyl, canvas, paper, or a combination of two or more materials. Preferred materials are durable and can withstand rips and tears, but flexible enough to store, collapse, and be easily transported. The material or combination of materials is preferably air tight to prevent the loss of carbon dioxide during treatment. FIG. 1 shows an exemplary embodiment 10 with an enclosure or bag 14 with an article 12, such as a mattress or box spring, inside of it. The structure or bag 14 includes a port 16 for either removing air or adding carbon dioxide such as from a tank through a hose. The bag 14 can optionally include a $CO_2$ verification indicator or monitor 18 for measuring the carbon dioxide level inside of the enclosure 14. The enclosure 14 is preferably sealable and unsealable. Exemplary sealing mechanisms include a zipper, hook and loop, snaps, hand sealers, or heat sealers. In some embodiments, the enclosure 14 is designed to be reused. In some embodiments, the enclosure 14 is designed for a one-time use. This may be beneficial so that the enclosure cannot become a source of contamination. FIG. 2 shows another exemplary embodiment 20 where the enclosure 14 includes more than one article 12 and 22. The enclosure 14 can optionally include a pump and/or vacuum that can engage with the port 16 and pump air out of the enclosure to accommodate the addition of carbon dioxide or add carbon dioxide into the enclosure. The enclosure 14 can also include an adaptor that both connects a carbon dioxide cartridge to the enclosure and cracks open the cartridge. Bags are advantageous because they can be readily transported and configured for one-time use. They can also be collapsed into a small space. The enclosure can optionally include a support structure for the articles to promote circulation around the article. FIG. 3 shows another exemplary embodiment 30 where the enclosure 14 includes articles 34. The enclosure also includes a $CO_2$ cartridge 32 placed inside of the enclosure to treat the articles 34. The enclosure 14 can be sealed with a zipper 36, snaps, hook and loop, or other sealing mechanism.

Like the bags, suitable totes are slightly larger than the contents they are designed to hold. The totes can be rigid or flexible. The totes can be designed to be reused or designed to be disposed of after use. Again, it may be beneficial for the tote to be disposed of so that it does not become a source of contamination. The totes include an opening for placing objects inside of the tote. They also include a port for removing air or adding carbon dioxide. They can also include a vent for releasing gas as carbon dioxide is added. The tote can optionally include a $CO_2$ verification indicator or monitor for measuring the carbon dioxide level inside of the enclosure. The tote is preferably sealable and unsealable. Exemplary sealing mechanisms include a zipper, hook and loop, snaps, hand sealers, or heat sealers. The tote can optionally include a pump and/or vacuum that can engage with the port and pump air out of the enclosure to accommodate the addition of carbon dioxide or pump carbon dioxide into the tote. The enclosure can also include an adaptor that both connects the carbon dioxide cartridge to the enclosure and cracks open the cartridge.

The Carbon Dioxide Source

The method uses carbon dioxide to treat articles that are suspected of having a bed bug infestation. If any bed bugs exist, the method is designed to kill them. In some embodiments, the carbon dioxide is dispensed using cartridges. The cartridges include a predetermined amount of carbon dioxide that is designed to keep the concentration of the carbon dioxide within the enclosure between about 50% and up to 100% of the volume of air in the enclosure, or from about 1.1 pounds (for example, for about 50% concentration) up to 2.2 pounds (for example, for 100% concentration) per cubic meter of the air space inside of the enclosure. When using cartridges, the cartridge is preferably 99.8% or greater carbon dioxide. Carbon dioxide is advantageous in this application because it is inert and nontoxic at low concentrations. But, it is unexpected that the carbon dioxide would be effective at killing bed bugs and bed bug eggs in less than 48 hours.

In order to manage the concentration of carbon dioxide within the enclosure, the cartridge can optionally include a regulator. The enclosure can optionally include an adaptor for connecting the cartridge to the enclosure where the adaptor both pierces the cartridge to release the carbon dioxide and then regulates the flow of the carbon dioxide. In operation, a user takes a carbon dioxide cartridge and opens it by piercing the cartridge. Once the cartridge is open, it starts releasing carbon dioxide. At this point, a user places the cartridge inside of the enclosure with the article, and seals the enclosure to prevent additional carbon dioxide from escaping. The regulator or adapter will release the carbon dioxide at a predetermined rate over the desired period of time so that the concentration of carbon dioxide remains sufficiently high to kill the bed bugs, but not so high as to become toxic. The carbon dioxide is preferably present at greater than 50%, greater than 75%, or up to or about 100% of the volume of air in the enclosure. The carbon dioxide may be present from about 50% up to 100% of the volume of air in the enclosure. The system preferably includes a carbon dioxide monitor to measure the carbon dioxide concentration.

In some embodiments, the enclosure may be large and configured to accommodate large objects like mattresses, box springs, and furniture. For these embodiments, it may be more practical to use a carbon dioxide tank instead of a cartridge. The tank preferably includes a regulator and a hose to bring the carbon dioxide into the enclosure. The hose may connect to the port on the enclosure.

The Methods

In some embodiments, the present disclosure includes methods for treating articles suspected of being infested with bed bugs. Articles may need to be treated, even if they are not actually infested with bed bugs, because it may be difficult to determine for certain if the article is infested or not. Further, if an infestation is discovered, it may be beneficial to treat an article to ensure that bed bugs have not contaminated that article.

In some embodiments, the method includes placing an article suspected of being infested with bed bugs in an enclosure, sealing the enclosure, releasing $CO_2$ inside of the sealed enclosure, and leaving the article inside of the sealed enclosure with the $CO_2$ for a period of time. In some embodiments, the method includes placing personal belongings inside of a enclosure with a pre-filled cartridge of $CO_2$, the cartridge comprising a regulator to control the release of $CO_2$ from the cartridge, opening the cartridge to start the release of $CO_2$ into the enclosure, sealing the enclosure, and leaving the article inside of the sealed enclosure with the $CO_2$ for a period of time, wherein the $CO_2$ is present from about 50% up to 100% by volume of air.

The amount of time that the article spends inside the enclosure can be up to about 48 hours, up to about 24 hours, up to about 20 hours, or up to about 16 hours. In a preferred embodiment, the article remains inside of the sealed enclosure with the carbon dioxide for about 16 to about 20 hours.

In some embodiments, the temperature inside of the sealed enclosure is around room temperature. In some embodiments, the temperature inside of the sealed enclosure can be elevated to 100° F., 115° F., 118° F., or 120° F.

In some embodiments, the article is treated once in order to kill the bed bugs. In some embodiments, it is beneficial to treat the article as part of a treatment program where the article is treated multiple times. An exemplary treatment schedule includes a first treatment, followed by a second treatment 24 hours after the first treatment, followed by a third treatment two weeks after the first treatment. Another exemplary treatment schedule includes a first treatment, followed by a second treatment two weeks after the first treatment. Other exemplary treatment schedules could be used. When additional treatments are used, the additional treatments may be different, similar, or identical, to the first treatment.

The Kits

In some embodiments, the present disclosure includes kits for treating articles suspected of being infested with bed bugs. The kits can include the components for treating the articles and instructions for how to use the components to treat the articles. In some embodiments, the kit includes an enclosure and at least one carbon dioxide cartridge. A kit can include just one carbon dioxide cartridge in the case of systems that are designed to be disposable or for one-time use only. Alternatively, the kit can include multiple carbon dioxide cartridges that allow the kit to be used again if multiple treatments are needed or if a user wants the kit to be available to treat new articles at a later date. The kit is especially suited for consumer use. Bed bugs infestations have increased with the increase in travel. And travelers eventually need to return home, potentially bringing bed bugs with them. This kit allows a user to treat articles that are suspected of being infested with bed bugs at home. In addition to including the components, the kit can include instructions for using the components. Nonlimiting examples of instructions can include instructions for placing the article inside of the enclosure, opening one of the $CO_2$ cartridges, placing the $CO_2$ cartridge inside of the enclosure with the article, sealing the enclosure, and leaving the article and the $CO_2$ cartridge inside of the enclosure for a period of time such as up to about 48 hours, up to about 24 hours, up to about 20 hours, up to about 16 hours, or about 16 hours to about 20 hours.

The present disclosure may be better understood with reference to the following example. This example is intended to be representative of specific embodiments of the disclosure, and is not intended as limiting the scope of the disclosure.

EXAMPLES

Example 1

Efficacy of carbon Dioxide at Killing All Life Stages of Bed Bugs

Example 1 determined the efficacy of carbon dioxide at killing all life stages of bed bugs. To test the efficacy on eggs, one week before testing and immediately post feeding, eight fed adult female bed bugs and two fed adult male bed bugs were placed on fresh filter paper to lay testing eggs over a seven day period of time. On day 7, 24 hours before testing, the filter papers with the adults and eggs were placed into a freezer set at 10° F. for 10 minutes. This was long enough for the adult bed bugs to be easily removed from the filter paper by very gentle tapping. The adult bed bugs were removed without displacing the eggs. The eggs were counted and placed into breathable containers. The containers were placed inside of enclosures and the enclosures were sealed and the treatment was applied. The concentration of the carbon dioxide was tracked using a $CO_2$ meter. The containers were removed from the enclosures after a 20-hour exposure time. The containers were observed for any hatching on day 16.

Figure 4:
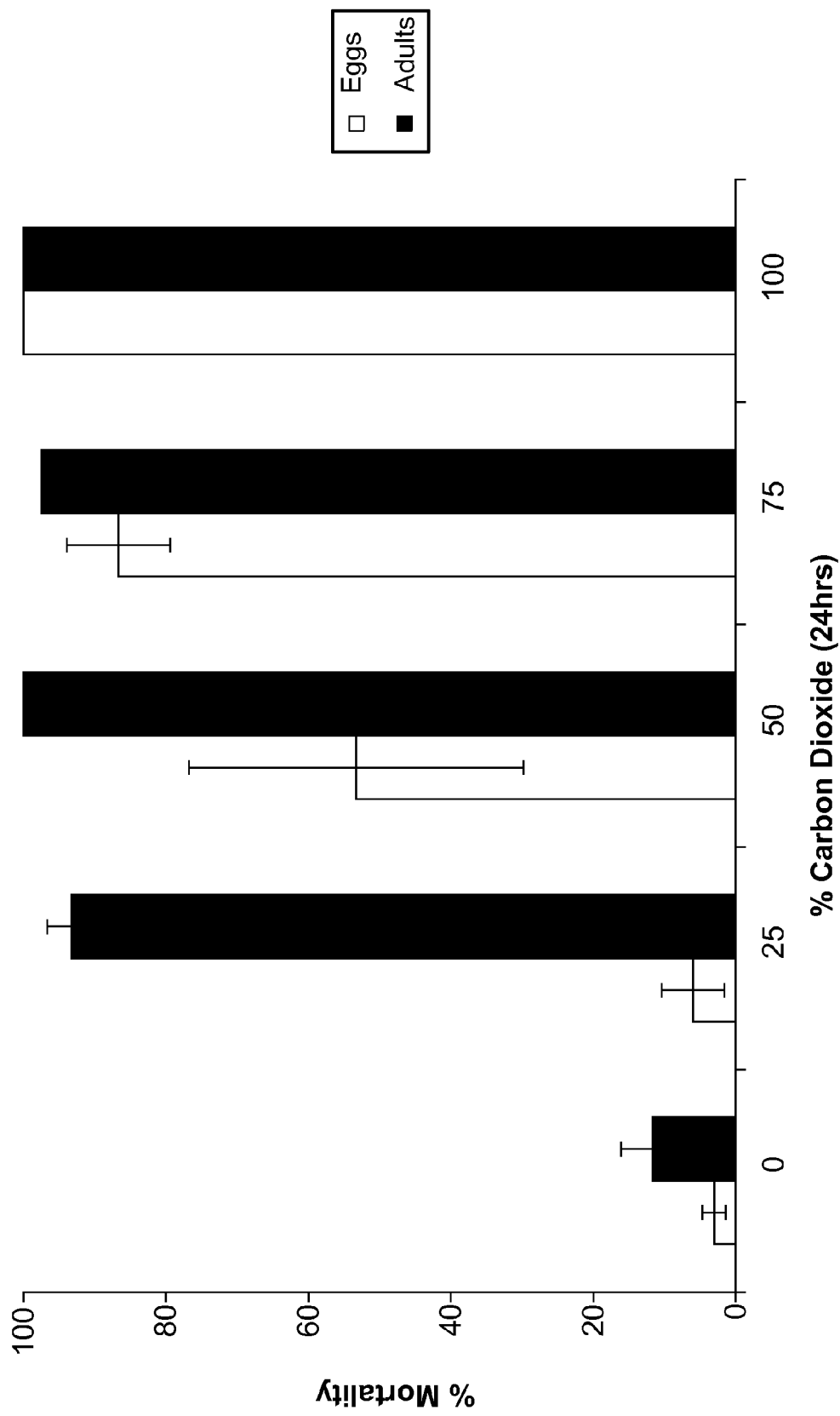
FIG. 4 shows the efficacy of carbon dioxide on bed bug adults and eggs.

To test the efficacy on adults, 24 hours before testing, adult bed bugs were fed. 10 fed bed bugs were placed onto fresh filter paper. The filter paper was placed into a jar. The jar was placed into an enclosure, the enclosure was sealed and the treatment was applied. The jar was removed from the enclosure after a 20-hour exposure time. The jar was immediately observed for mortality and then observed again for mortality at 24-hours and one week after removal from the enclosure. The results are shown in FIG. 4 which shows that carbon dioxide kills bed bug eggs and adults.

The above specification, example and data provide a description of the disclosure. Since many embodiments of the disclosure can be made without departing from the spirit and scope of the disclosure, the invention resides in the claims.

We claim:

1. A method of treating an article comprising:
   a. placing an article suspected of being infested with bed bugs in an enclosure comprising an inlet port;
   b. closing the enclosure;
   c. releasing $CO_2$ inside the enclosure through the inlet port until the concentration of $CO_2$ inside the enclosure is between 50% and 100% by volume of air; and
   d. leaving the article inside of the enclosure at room temperature with the $CO_2$ for about 16 to 48 hours.

2. The method of claim 1, wherein the article is a personal article selected from the group consisting of furniture, books, DVDs, picture frames, knick knacks, clothes, linen, and electronics.

3. The method of claim 1, wherein the enclosure is a sealable bag that is slightly larger than the article being treated.

4. The method of claim 3, the bag further comprising an additional feature selected from the group consisting of a vacuum, and a carbon dioxide monitor.

5. The method of claim 1, wherein the concentration of $CO_2$ is from about 1.1 pounds up to 2.2 pounds per cubic meter of air inside of the enclosure.

6. The method of claim 1, further comprising leaving the article inside of the sealed enclosure with the $CO_2$ for up to 20 hours.

7. The method of claim 1, wherein the $CO_2$ is released from a cartridge.

8. The method of claim 1, wherein the $CO_2$ is released from a tank.

9. The method of claim 7, wherein the $CO_2$ inside of the cartridge is at least 99.8% $CO_2$.

10. The method of claim 7, wherein the enclosure comprises an adaptor that pierces the cartridge to release the $CO_2$ and regulates the flow of the $CO_2$.

11. The method of claim 1, wherein the enclosure comprises a collapsible bag.

12. The method of claim 1, wherein the article is a mattress and the enclosure is constructed to be slightly larger than the article.

13. The method of claim 1, wherein the article is a piece of furniture.

14. The method of claim 1, wherein step (a) comprises placing a plurality of articles inside the enclosure.

15. The method of claim 14, wherein the plurality of articles comprises furniture, a mattress, a box spring, bedding, or a combination thereof.

16. The method of claim 1 further comprising sealing the enclosure.

17. The method of claim 1, wherein gases from the enclosure can be eliminated through the inlet port.

18. The method of claim 1, wherein the inlet port comprises a vent.

* * * * *